United States Patent
Waffenschmidt et al.

(10) Patent No.: US 9,941,932 B2
(45) Date of Patent: Apr. 10, 2018

(54) PICKING-UP SIGNALS IN ELECTRICALLY CONTACTLESS MANNERS

(71) Applicant: KONINKLIJKE PHILIPS N.V., Eindhoven (NL)

(72) Inventors: Eberhard Waffenschmidt, Eindhoven (NL); Bernd Ackermann, Eindhoven (NL); Theodorus Johannes Petrus Van Den Biggelaar, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/907,622

(22) PCT Filed: Jul. 16, 2014

(86) PCT No.: PCT/EP2014/065199
§ 371 (c)(1),
(2) Date: Jan. 26, 2016

(87) PCT Pub. No.: WO2015/010975
PCT Pub. Date: Jan. 29, 2015

(65) Prior Publication Data
US 2016/0173168 A1 Jun. 16, 2016

(30) Foreign Application Priority Data

Jul. 26, 2013 (EP) ..................... 13178201

(51) Int. Cl.
*H04B 5/00* (2006.01)
*H04B 3/56* (2006.01)
(Continued)

(52) U.S. Cl.
CPC ............ *H04B 5/0012* (2013.01); *H02J 50/05* (2016.02); *H04B 3/56* (2013.01); *H04B 5/0031* (2013.01);
(Continued)

(58) Field of Classification Search
CPC . H04L 12/10; H02J 50/05; H04B 3/56; H04B 5/0031; H04B 5/0037; H04B 2203/5483; H04B 5/0075; H04B 5/0012
See application file for complete search history.

(56) References Cited

U.S. PATENT DOCUMENTS

| 4,644,321 A | 2/1987 | Kennon |
| 4,668,934 A | 5/1987 | Shuey |

(Continued)

FOREIGN PATENT DOCUMENTS

| EP | 0092734 A2 | 2/1983 |
| EP | 0092734 A3 | 2/1983 |

(Continued)

*Primary Examiner* — Andrew Wendell
*Assistant Examiner* — Maryam Soltanzadeh
(74) *Attorney, Agent, or Firm* — Meenakshy Chakravorty

(57) ABSTRACT

Pick-up devices (1-9) for picking-up signals from first cables (21, 22) in electrically contactless manners comprise first arrangements (31) for picking-up power signals from the first cables (21, 22) in inductive manners and second arrangements (35, 36) for picking-up data signals from the first cables (21, 22) in capacitive manners. The first arrangements (31) may comprise inductive couplings such as magnetic cores (61, 62) with first openings for surrounding parts of first conductors (21) of the first cables (21, 22) and with second openings for surrounding parts of second conductors (22) of the first cables (21, 22). The second arrangements (35, 36) may comprise capacitive couplings such as first and second electrodes (71-74). The pick-up devices (1-9) may be pick-up and transfer devices (3) for transferring the signals to second cables (23, 24) in electrically contactless manners. Provision devices (10) provide the signals in electrically conductive manners and termination devices (11-13) terminate the cables (21-24).

2 Claims, 6 Drawing Sheets

(51) Int. Cl.
*H02J 50/05* (2016.01)
*H04L 12/10* (2006.01)

(52) U.S. Cl.
CPC ........... *H04B 5/0037* (2013.01); *H04L 12/10* (2013.01); *H04B 5/0075* (2013.01); *H04B 2203/5483* (2013.01)

(56) References Cited

U.S. PATENT DOCUMENTS

| | | | |
|---|---|---|---|
| 5,237,293 A * | 8/1993 | Kan | H01P 1/266 200/51.1 |
| 5,625,352 A | 4/1997 | Klemm et al. | |
| 5,757,177 A * | 5/1998 | Farnsworth | H01Q 1/46 324/323 |
| 5,856,776 A * | 1/1999 | Armstrong | H04B 3/56 340/538.15 |
| 5,892,411 A | 4/1999 | Schwan et al. | |
| 7,072,407 B2 * | 7/2006 | Schurig | H04B 3/542 375/257 |
| 7,358,745 B1 * | 4/2008 | Lo | H04L 43/50 324/533 |
| 9,319,108 B2 * | 4/2016 | Bauer | H04B 5/0037 |
| 2002/0150116 A1 * | 10/2002 | Huang | H04B 3/548 370/431 |
| 2002/0154518 A1 | 10/2002 | Elferich et al. | |
| 2003/0091118 A1 | 5/2003 | Lohr | |
| 2003/0094855 A1 | 5/2003 | Lohr et al. | |
| 2005/0062589 A1 * | 3/2005 | Cern | H04B 3/56 455/41.1 |
| 2006/0290460 A1 | 12/2006 | Waffenschmidt et al. | |
| 2007/0075256 A1 * | 4/2007 | Buller | B82Y 10/00 250/396 R |
| 2008/0125035 A1 | 5/2008 | Dellantoni et al. | |
| 2009/0259772 A1 * | 10/2009 | Ketko | G06K 7/0021 710/13 |
| 2016/0241313 A1 * | 8/2016 | Coldrey | H01Q 1/007 |

FOREIGN PATENT DOCUMENTS

| | | |
|---|---|---|
| EP | 0525459 A1 | 2/1993 |
| WO | 9836507 A1 | 8/1998 |
| WO | 2012049582 A1 | 4/2012 |
| WO | 2013046104 A1 | 4/2013 |

\* cited by examiner

PICKING-UP SIGNALS IN ELECTRICALLY CONTACTLESS MANNERS

CROSS-REFERENCE TO PRIOR APPLICATIONS

This application is the U.S. National Phase application under 35 U.S.C. § 371 of International Application No. PCT/EP2014/065199, filed on Jul. 16, 2014, which claims the benefit of European Patent Application No. 13178201.3, filed on Jul. 26, 2013. These applications are hereby incorporated by reference herein.

FIELD OF THE INVENTION

The invention relates to a pick-up device for picking-up signals from a first cable in an electrically contactless manner. The invention further relates to a provision device for providing the signals to the first cable in an electrically conductive manner and to a termination device for terminating the first cable or a second cable.

BACKGROUND OF THE INVENTION

U.S. Pat. No. 4,644,321 discloses a wireless power line communication apparatus. The apparatus comprises a toroid for inductively coupling the apparatus to a power line.

EP 0 092 734 discloses a regenerator for an intra-bundle power line communication system.

U.S. Pat. No. 5,892,411 discloses a data transmission device.

SUMMARY OF THE INVENTION

It is an object of the invention to provide an improved pick-up device. It is a further object of the invention to provide a provision device and a termination device.

According to a first aspect, a pick-up device is provided for picking-up signals from a first cable in an electrically contactless manner, the pick-up device comprising
  a first arrangement for picking-up a power signal from the first cable in an inductive manner, and
  a second arrangement for picking-up a data signal from the first cable in a capacitive manner, the data signal being different from the power signal,
the pick-up device being a pick-up and transfer device for transferring the signals to a second cable in an electrically contactless manner, the first arrangement being arranged for transferring the power signal to the second cable in an inductive manner, and the second arrangement being arranged for transferring the data signal to the second cable in a capacitive manner.

The pick-up device is arranged for picking-up signals from a first cable in an electrically contactless manner. Thereto, the pick-up device comprises a first arrangement for picking-up a power signal from the first cable in an inductive manner and a second arrangement for picking-up a data signal from the first cable in a capacitive manner. A power signal is mainly arranged to feed an apparatus such as for example a load, and a data signal is mainly arranged to inform and/or to control the apparatus. By picking-up the power signal in an inductive manner and by picking-up the data signal in a capacitive manner, both different kinds of signals are picked-up in different kinds of manners. This way, any interference between the different kinds of signals is minimized, which is a great improvement. Further, the pick-up and transfer device picks-up the signals from the first cable and transfers them to the second cable.

Possibly, the first arrangement comprises an inductive coupling, the inductive coupling comprising a core, and the second arrangement comprises a capacitive coupling, the capacitive coupling comprising at least one electrode. Preferably, to realize the picking-up of the power signal in an inductive manner, an inductive coupling is used, and to realize the picking-up of the data signal in a capacitive manner, a capacitive coupling is used. The inductive coupling for example comprises a core with an opening for surrounding at least a part of a cross section of one of the conductors of the first cable, with the other conductor simply passing this core. The capacitive coupling for example comprises at least one electrode, such as one or more electrodes surrounding one of the conductors of the first cable or such as a common electrode surrounding both conductors of the first cable, in which cases a return path may for example be realized via earth.

Possibly, the core comprises a magnetic core with a first opening for surrounding at least a part of a cross section of a first conductor of the first cable and with a second opening for surrounding at least a part of a cross section of a second conductor of the first cable, and the at least one electrode comprises first and second electrodes, the first electrodes being located closer to the first conductor than to the second conductor, and the second electrodes being located closer to the second conductor than to the first conductor. In view of the magnetic core, the first and second conductors represent one or more primary windings of a transformer comprising the magnetic core. By introducing one or more secondary windings going through the first and second openings of this transformer, the power signal can be delivered. In view of the first electrodes and the first conductor, their first combination represents a first capacitor. In view of the second electrodes and the second conductor, their second combination represents a second capacitor. By introducing first and second wires coupled to the first and second electrodes, the data signal can be delivered.

Compared to said core with said one opening, the magnetic core with the first and second openings offers a (much) more symmetrical solution with (strongly) reduced magnetic stray fields and a (much) better defined first cable inductivity. Compared to said at least one electrode, the respective first and second electrodes located closer to the respective first and second conductors offer a solution with (strongly) reduced common mode currents and a (much) better defined return path.

Possibly, the first and second electrodes are arranged in the magnetic core or form integral parts of the magnetic core. Preferably, by arranging the first and second electrodes in the magnetic core or by letting the first and second electrodes form integral parts of the magnetic core, a most compact pick-up device has been created which for example can be easily enclosed by one housing.

Possibly, the magnetic core comprises two E-shaped cores with ends of the upper legs being in contact with each other and with ends of the lower legs being in contact with each other and with ends of the center legs being in contact with each other. Preferably, both E-shaped cores are connectable and disconnectable to make an installation easier.

Possibly, the power signal operates in a first frequency range, and the data signal operates in a second frequency range, second frequencies in the second frequency range being different from and higher than first frequencies in the first frequency range. Preferably, when picking-up power signals in an inductive manner, a lower frequency range is used for the power signals, and when picking-up data signals in a capacitive manner, a higher frequency range is used for the data signals.

Possibly, the first cable is arranged to transport a first cable signal different from the data signal and the power signal. The first cable may be arranged to transport an AC supply signal or a DC supply signal or an audio signal or a video signal or an internet signal etc. The first cable signal should operate in a third frequency range, whereby third frequencies in the third frequency range should be different from the first and second frequencies.

An embodiment of the pick-up device is defined by the first arrangement comprising an inductive coupling, and the second arrangement comprising a capacitive coupling, the inductive coupling comprising a magnetic core with a first opening for surrounding at least a part of a cross section of a first conductor of the first cable and for surrounding at least a part of a cross section of a third conductor of the second cable and with a second opening for surrounding at least a part of a cross section of a second conductor of the first cable and for surrounding at least a part of a cross section of a fourth conductor of the second cable, and the capacitive coupling comprising first and second electrodes, the first electrodes being located closer to the first and third conductors than to the second and fourth conductors, and the second electrodes being located closer to the second and fourth conductors than to the first and third conductors. In view of the magnetic core, the first and second conductors of the first cable represent one or more primary windings of a transformer comprising the magnetic core and the third and fourth conductors of the second cable represent one or more secondary windings of this transformer. In view of the first electrodes and the first and third conductors, their first combination represents a first capacitor. In view of the second electrodes and the second and fourth conductors, their second combination represents a second capacitor.

According to a second aspect, a provision device is provided for providing signals to a first cable in an electrically conductive manner, the provision device comprising
  a third arrangement for providing a power signal to the first cable, and
  a fourth arrangement for providing a data signal to the first cable, the data signal being different from the power signal,
the third arrangement comprising a current source, the power signal being a current signal flowing through conductors of the first cable, and the fourth arrangement comprising a voltage source, the data signal being a voltage signal present across the conductors of the first cable.

According to a third aspect, a termination device is provided for terminating a first cable coupled to the provision device as defined above or for terminating a second cable coupled to the pick-up device as defined above, the termination device comprising
  a fifth arrangement for providing a first impedance to the power signal and for providing a second impedance to the data signal, the second impedance being higher than the first impedance. The fifth arrangement creates a loop for the power signal and creates an open end or a match for the data signal.

An embodiment of the termination device is defined by the fifth arrangement comprising a magnetic core with a first opening for surrounding at least a part of a cross section of a first conductor of the first cable or for surrounding at least a part of a cross section of a third conductor of the second cable and with a second opening for surrounding at least a part of a cross section of a second conductor of the first cable or for surrounding at least a part of a cross section of a fourth conductor of the second cable, the first and second conductors or the third and fourth conductors being coupled to each other in an electrically conductive manner behind the magnetic core, and the fifth arrangement further comprising a resistive and capacitive coupling, the resistive and capacitive coupling comprising a resistor for matching the first or second cable with respect to the data signal and comprising a capacitor for blocking the power signal. The magnetic core provides an inductive coupling that forms a relatively low impedance to the power signal and that forms a relatively high impedance to the data signal, the resistor provides the matching to avoid standing waves, and the capacitor prevents that the power signal is dissipated via the resistor.

An insight is that power signals and data signals are to be treated differently. A basic idea is that power signals are to be picked-up inductively and data signals are to be picked up capacitively.

A problem to provide an improved pick-up device has been solved. A further advantage is that a system comprising pick-up devices, provision devices and termination devices can be easily introduced to improve efficiencies of existing cables. These and other aspects of the invention will be apparent from and elucidated with reference to the embodiments described hereinafter.

DETAILED DESCRIPTION OF EMBODIMENTS

Figure 1:
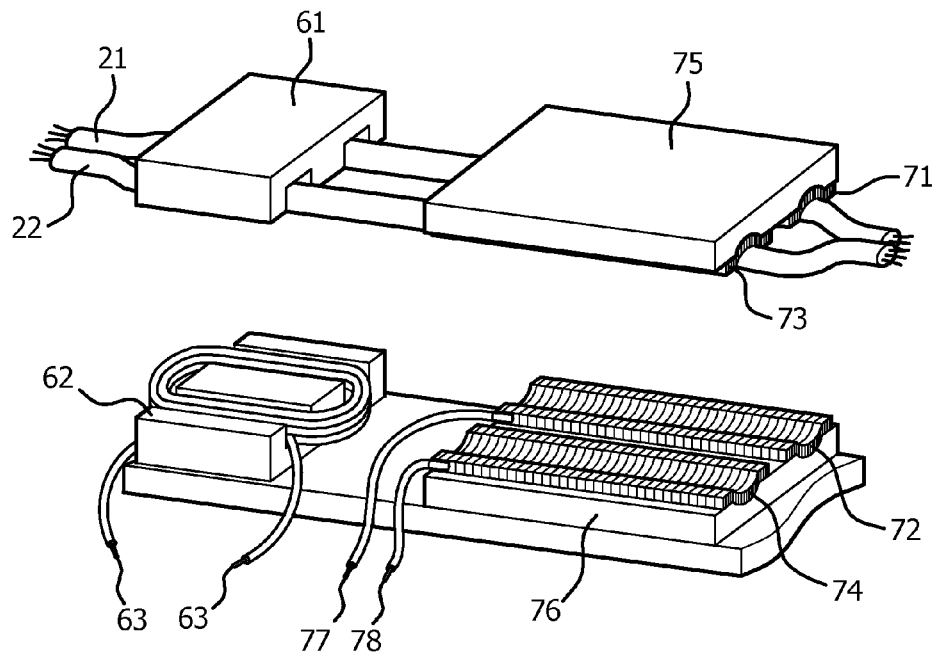
FIG. 1 shows an embodiment of a pick-up device.
Figures 2, 3:
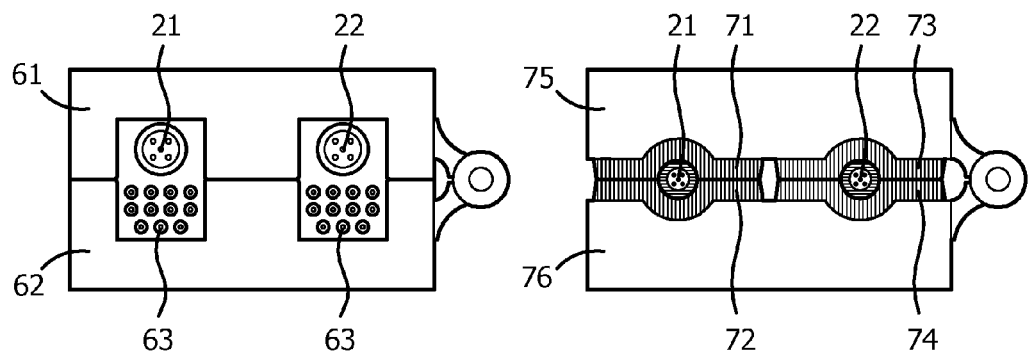
FIG. 2 shows a cross-section of a left part of the FIG. 1.
FIG. 3 shows a cross-section of a right part of the FIG. 1.

In the FIG. 1, an embodiment of a pick-up device is shown, and in the FIGS. 2 and 3, cross-sections of left and right parts of the FIG. 1 are shown. The pick-up device comprises a magnetic core 61, 62 with a first opening for surrounding at least a part of a cross section of a first conductor 21 of a first cable 21, 22 and with a second opening for surrounding at least a part of a cross section of a second conductor 22 of the first cable 21, 22. The conductors 21, 22 represent one or more primary windings. The pick-up device further comprises a wire 63 representing one or more secondary windings going through the first and second openings. A power signal flowing through the conductors 21, 22 is picked-up in an inductive manner via the magnetic core 61, 62 and is delivered via the wire 63.

The magnetic core 61, 62 such as for example a soft-magnetic core comprises two parts which can be connected and disconnected to each other, for example via a hinge, a top part 61 and a bottom part 62. These top and bottom parts 61, 62 may for example be E-shaped cores with ends of the upper legs being in contact with each other and with ends of the lower legs being in contact with each other and with ends of the center legs being in contact with each other. Alternatively, the magnetic core 61, 62 may consist of one part only or may comprise three or more parts. An advantage of a core consisting of moveable parts is that an installation becomes easier.

The pick-up device further comprises first electrodes 71, 72 located closer to the first conductor 21 than to the second conductor 22, and second electrodes 73, 74 located closer to the second conductor 22 than to the first conductor 21. The first electrodes 71, 72 together with the first conductor 21 represent a first capacitor. The second electrodes 73, 74 together with the second conductor 22 represent a second capacitor. By introducing first and second wires 77, 78 coupled to the first and second electrodes 71-74, a data signal present across the conductors 21, 22 is picked-up in a capacitive manner via the electrodes 71-74 and is delivered via the wires 77, 78. Third electrodes are not to be excluded.

The pick-up device for example comprises a top base 75 comprising first top electrodes 71 and second top electrodes 73 and a bottom base 76 comprising first bottom electrodes 72 and second bottom electrodes 74. The top base 75 and the bottom base 76 can be connected and disconnected to each other, for example via a hinge. Alternatively, a combination of the top base 75 and the bottom base 76 may consist of one part only or may comprise three or more parts. An advantage of a combination consisting of moveable parts is that an installation becomes easier.

So, in the FIG. 1-3, a pick-up device is shown for picking-up signals from a first cable 21, 22 in an electrically contactless manner. Thereto, the pick-up device comprises a first arrangement for picking-up a power signal from the first cable 21, 22 in an inductive manner, and a second arrangement for picking-up a data signal from the first cable 21, 22 in a capacitive manner. These arrangements will be discussed at the hand of the FIG. 10. The data signal is different from the power signal, as also discussed at the hand of the FIG. 10.

Preferably, the first arrangement comprises an inductive coupling, and the second arrangement comprises a capacitive coupling. The magnetic core 61, 62 is an example of such an inductive coupling, without having excluded other kinds of inductive couplings such as for example other kinds of cores and coreless solutions such as an inductor or a toroid etc. The combination of the top base 75 with the first top electrodes 71 and the second top electrodes 73 and the bottom base 76 with the first bottom electrodes 72 and the second bottom electrodes 74 is an example only, without having excluded other kinds of capacitive couplings such as for example other kinds of bases and baseless solutions etc.

Figure 4:
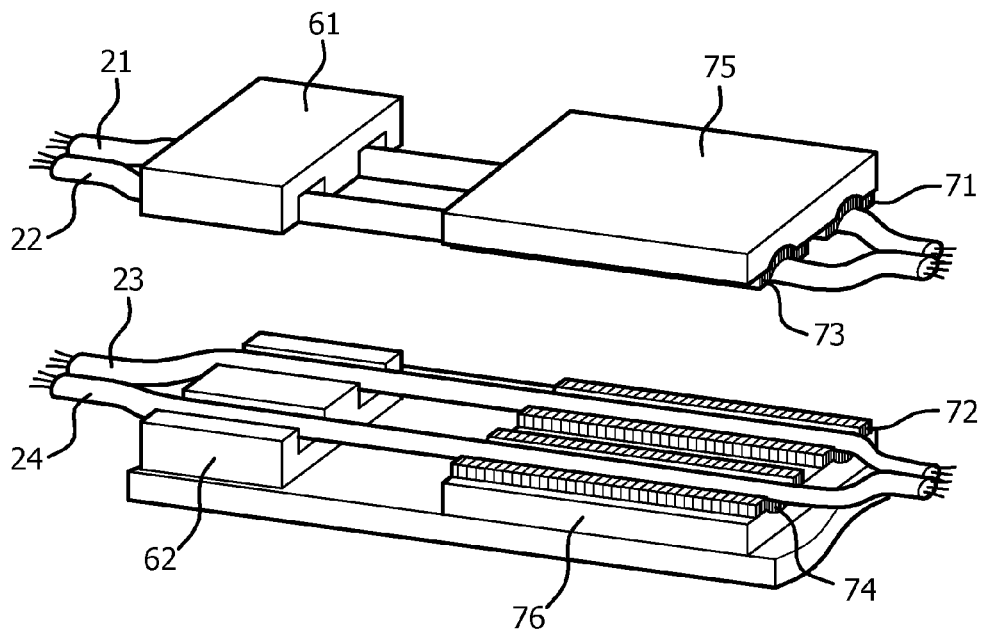
FIG. 4 shows an embodiment of a pick-up and transfer device.
Figure 5:
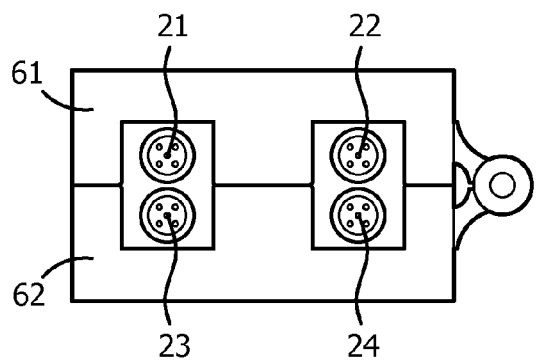
FIG. 5 shows a cross-section of a left part of the FIG. 4.
Figure 6:
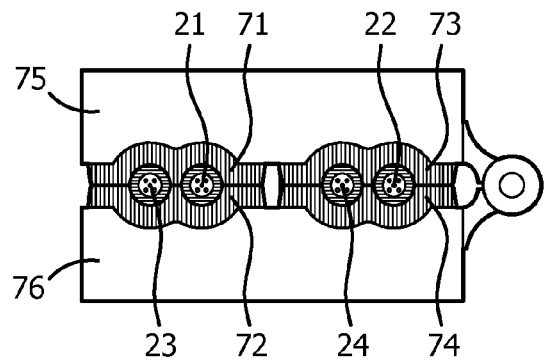
FIG. 6 shows a cross-section of a right part of the FIG. 4.

In the FIG. 4, an embodiment of a pick-up and transfer device is shown, and in the FIGS. 5 and 6, cross-sections of left and right parts of the FIG. 4 are shown. The pick-up and transfer device comprises a magnetic core 61, 62 with a first opening for surrounding at least a part of a cross section of a first conductor 21 of a first cable 21, 22 and for surrounding at least a part of a cross section of a third conductor 23 of a second cable 23, 24 and with a second opening for surrounding at least a part of a cross section of a second conductor 22 of the first cable 21, 22 and for surrounding at least a part of a cross section of a fourth conductor 24 of the second cable 23, 24. The conductors 21, 22 represent one or more primary windings and the conductors 23, 24 represent one or more secondary windings. A power signal flowing through the conductors 21, 22 is picked-up in an inductive manner via the magnetic core 61, 62 and is transferred to the conductors 23, 24.

The magnetic core 61, 62 such as for example a soft-magnetic core comprises two parts which can be connected and disconnected to each other, for example via a hinge, a top part 61 and a bottom part 62. These top and bottom parts 61, 62 may for example be E-shaped cores with ends of the upper legs being in contact with each other and with ends of the lower legs being in contact with each other and with ends of the center legs being in contact with each other. Alternatively, the magnetic core 61, 62 may consist of one part only or may comprise three or more parts. An advantage of a core consisting of moveable parts is that an installation becomes easier.

The pick-up and transfer device further comprises first electrodes 71, 72 located closer to the first and third conductors 21, 23 than to the second and fourth conductors 22, 24, and second electrodes 73, 74 located closer to the second and fourth conductors 22, 24 than to the first and third conductors 21, 23. The first electrodes 71, 72 together with the first and third conductors 21, 23 represent a first capacitor. The second electrodes 73, 74 together with the second and fourth conductors 22, 24 represent a second capacitor. A data signal present across the conductors 21, 22 is picked-up in a capacitive manner via the electrodes 71-74 and is transferred to the conductors 23, 24. Third electrodes are not to be excluded.

The pick-up and transfer device for example comprises a top base 75 comprising first top electrodes 71 and second top electrodes 73 and a bottom base 76 comprising first bottom electrodes 72 and second bottom electrodes 74. The top base 75 and the bottom base 76 can be connected and disconnected to each other, for example via a hinge. Alternatively, a combination of the top base 75 and the bottom base 76 may consist of one part only or may comprise three or more parts. An advantage of a combination consisting of moveable parts is that an installation becomes easier.

So, in the FIG. 4-6, a pick-up and transfer device is shown for picking-up signals from a first cable 21, 22 in an electrically contactless manner and for transferring these signals to a second cable 23, 24 in an electrically contactless manner. Thereto, the pick-up device comprises a first arrangement for picking-up a power signal from the first cable 21, 22 in an inductive manner, and a second arrangement for picking-up a data signal from the first cable 21, 22 in a capacitive manner. The first arrangement is arranged for transferring the power signal to the second cable 23, 24 in an inductive manner, and the second arrangement is arranged for transferring the data signal to the second cable 23, 24 in a capacitive manner. These arrangements will be discussed at the hand of the FIG. 11. The data signal is different from the power signal, as also discussed at the hand of the FIG. 11.

Preferably, the first arrangement comprises an inductive coupling, and the second arrangement comprises a capacitive coupling. The magnetic core 61, 62 is an example of such an inductive coupling, without having excluded other kinds of inductive couplings such as for example other kinds of cores and coreless solutions such as cables shaped as inductors or toroids etc. The combination of the top base 75 with the first top electrodes 71 and the second top electrodes 73 and the bottom base 76 with the first bottom electrodes 72 and the second bottom electrodes 74 is an example only, without having excluded other kinds of capacitive couplings such as for example other kinds of bases and baseless solutions etc.

Figure 7:
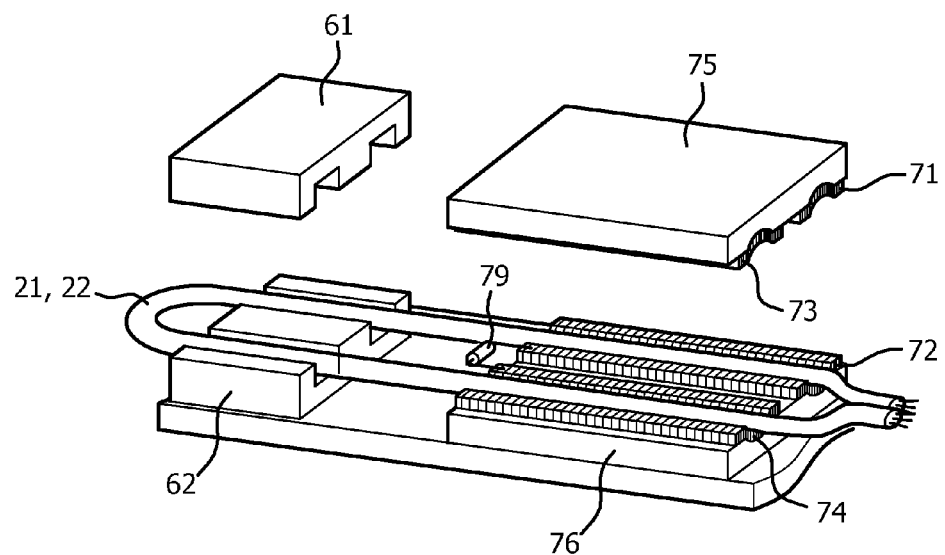
FIG. 7 shows an embodiment of a termination device.
Figures 8, 9:
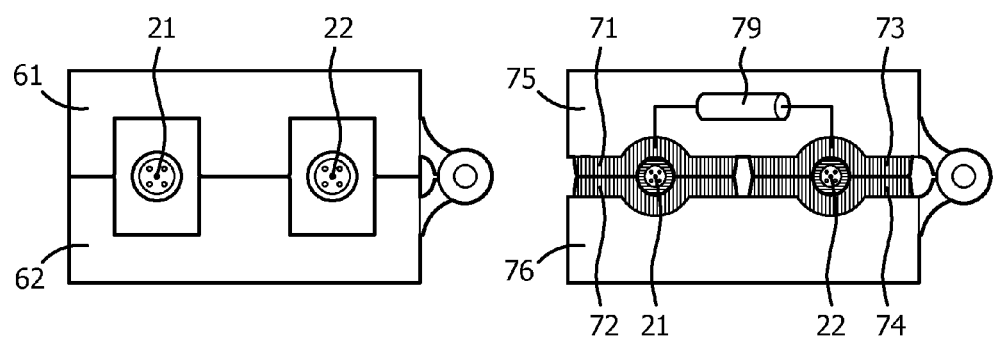
FIG. 8 shows a cross-section of a left part of the FIG. 7.
FIG. 9 shows a cross-section of a right part of the FIG. 7.

In the FIG. 7, an embodiment of a termination device is shown, and in the FIGS. 8 and 9, cross-sections of left and right parts of the FIG. 7 are shown. The termination device comprises a magnetic core 61, 62 with a first opening for surrounding at least a part of a cross section of a first conductor 21 of a first cable 21, 22 and with a second opening for surrounding at least a part of a cross section of a second conductor 22 of the first cable 21, 22. Behind the magnetic core 61, 62, the first and second conductors 21, 22 are coupled to each other in an electrically conductive manner. A power signal flowing through the conductors 21, 22 experiences a relatively low impedance.

The magnetic core 61, 62 such as for example a soft-magnetic core comprises two parts which can be connected and disconnected to each other, for example via a hinge, a top part 61 and a bottom part 62. These top and bottom parts 61, 62 may for example be E-shaped cores with ends of the upper legs being in contact with each other and with ends of the lower legs being in contact with each other. The ends of the center legs may show an air gap, without being in contact with each other, to avoid saturation and/or to adjust an inductivity value. Air gaps at other locations are not to be excluded. Alternatively, the magnetic core 61, 62 may consist of one part only or may comprise three or more parts. An advantage of a core consisting of moveable parts is that an installation becomes easier.

The termination device further comprises first electrodes 71, 72 located closer to the first conductor 21 than to the second conductor 22, and second electrodes 73, 74 located closer to the second conductor 22 than to the first conductor 21. The first electrodes 71, 72 together with the first conductor 21 represent a first capacitor. The second electrodes 73, 74 together with the second conductor 22 represent a second capacitor. These first and second capacitors block the power signal. The termination device further comprises a resistor 79 for interconnecting the first and second electrodes 71-74, for example to match the first cable 21, 22 with respect to a data signal present across the conductors 21, 22. The data signal experiences a relatively high impedance. Third electrodes are not to be excluded.

The termination device for example comprises a top base 75 comprising first top electrodes 71 and second top electrodes 73 and a bottom base 76 comprising first bottom electrodes 72 and second bottom electrodes 74. The top base 75 and the bottom base 76 can be connected and disconnected to each other, for example via a hinge. Alternatively, a combination of the top base 75 and the bottom base 76 may consist of one part only or may comprise three or more parts. An advantage of a combination consisting of moveable parts is that an installation becomes easier.

Figure 10:
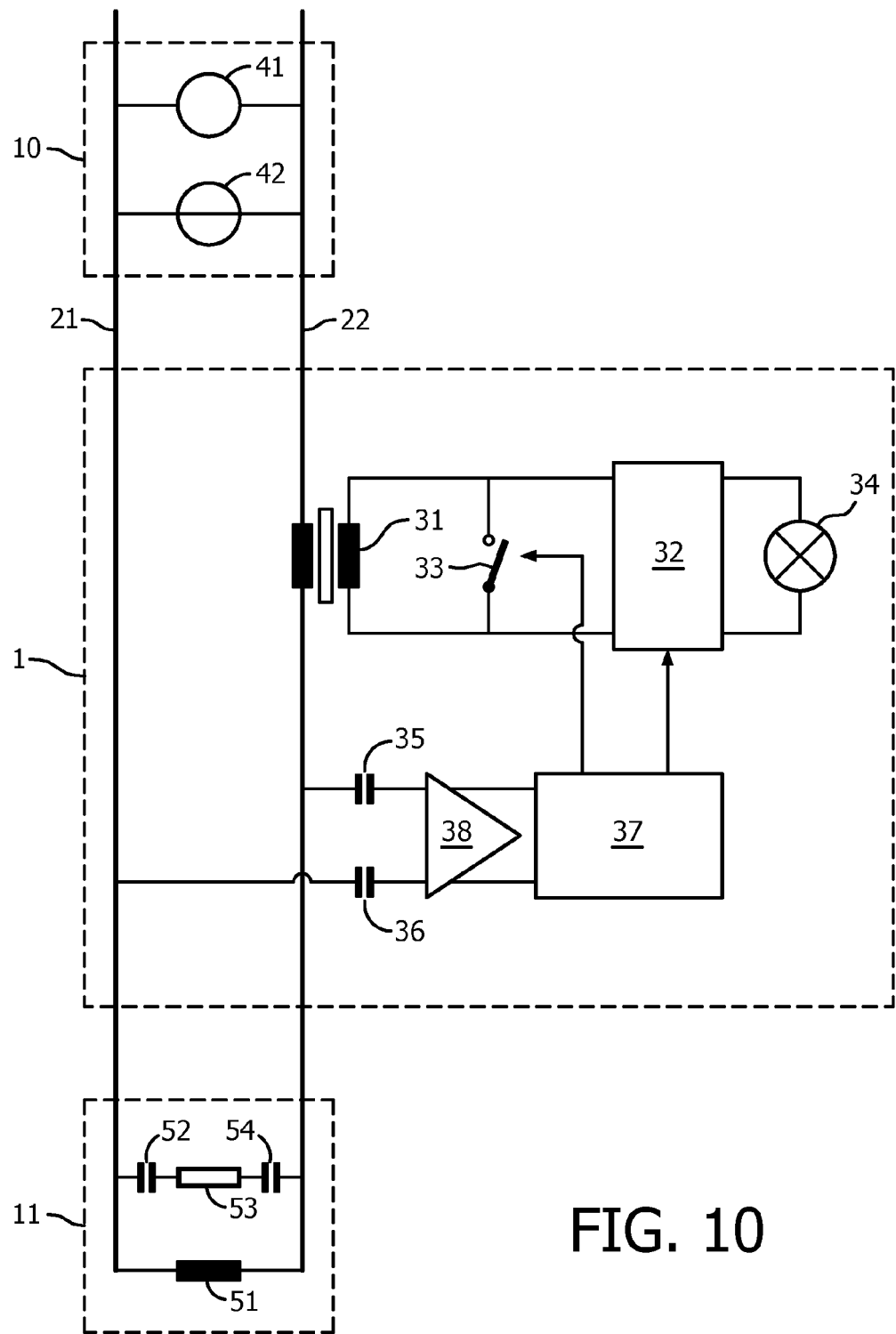
FIG. 10 shows a one cable system with three devices.
Figure 11:
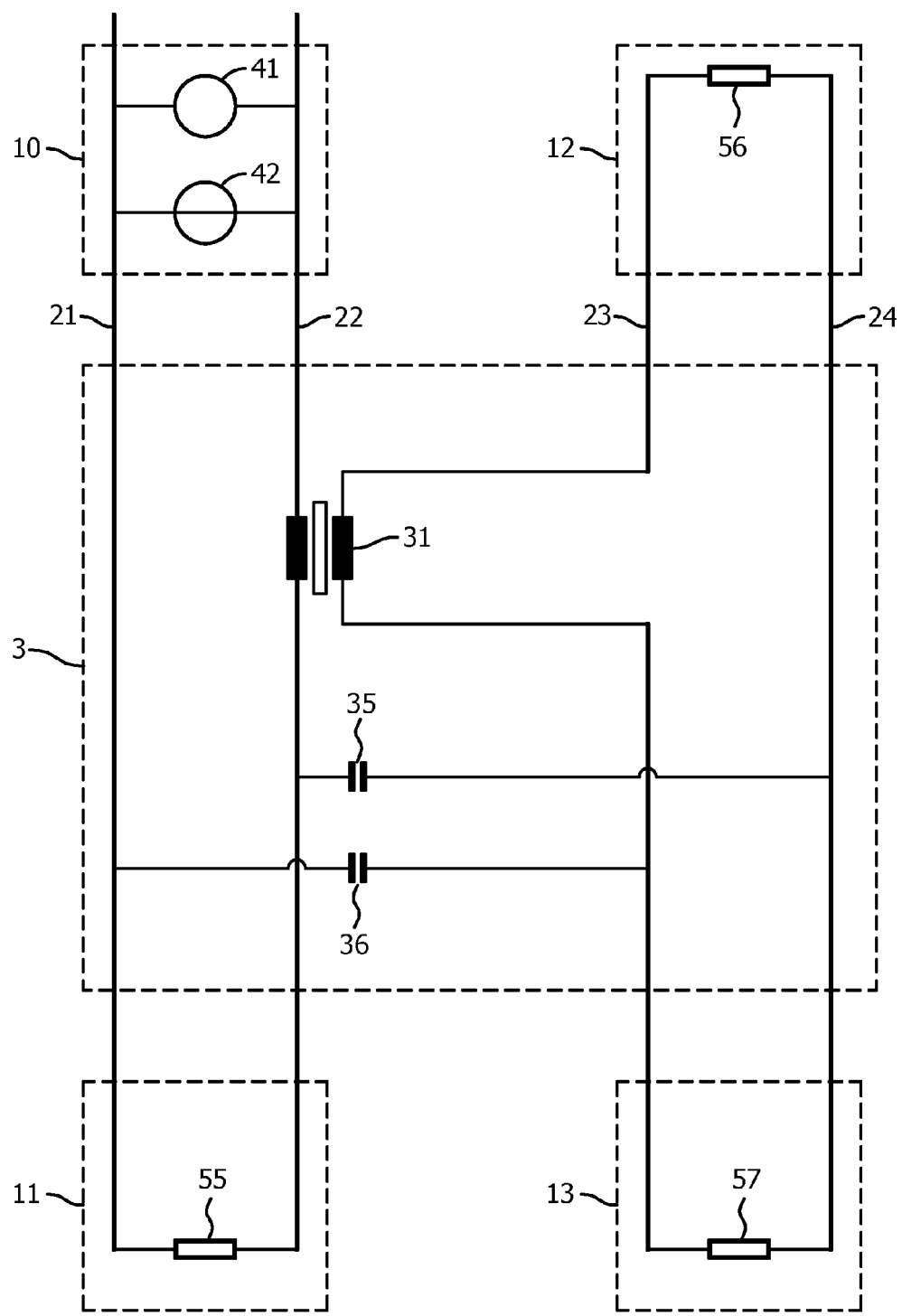
FIG. 11 shows a two cable system with five devices.

So, in the FIG. 7-9, a termination device is shown for terminating a first cable 21, 22 coupled to a provision device as discussed at the hand of the FIG. 10 or for terminating a second cable 23, 24 coupled to the pick-up and transfer device as discussed at the hand of the FIGS. 4-6 and the FIG. 11. Thereto, the termination device comprises a fifth arrangement for providing a relatively low impedance to the power signal and for providing a relatively high impedance to the data signal. This fifth arrangement will be discussed at the hand of the FIG. 10. The data signal is different from the power signal, as also discussed at the hand of the FIG. 10.

Preferably, the fifth arrangement comprises inductive and capacitive couplings wherein the magnetic core 61, 62 is an example of such an inductive coupling, without having excluded other kinds of inductive couplings such as for example other kinds of cores and coreless solutions such as a cable shaped as an inductor or a toroid etc. The combination of the top base 75 with the first top electrodes 71 and the second top electrodes 73 and the bottom base 76 with the first bottom electrodes 72 and the second bottom electrodes 74 is an example only, without having excluded other kinds of capacitive couplings such as for example other kinds of bases and baseless solutions etc. The resistor 79 may for example be realized via a real resistor or via resistive material present between the first electrodes 71, 72 and the second electrodes 73, 74 or via resistive electrodes etc.

In the FIG. 10, a one cable system with three devices 1, 10 and 11 is shown. A provision device 10 is coupled to first and second conductors 21, 22 of a first cable 21, 22 to provide signals to the first cable 21, 22 in an electrically conductive manner. Thereto, the provision device 10 comprising a third arrangement 41 for providing a power signal to the first cable 21, 22, and a fourth arrangement 42 for providing a data signal to the first cable 21, 22. The data signal is different from the power signal. Preferably, the third arrangement 41 comprises a current source, and the power signal is a current signal flowing through the conductors 21, 22. Preferably, the fourth arrangement 42 comprises a voltage source, and the data signal is a voltage signal present across the conductors 21, 22. An advantage of this is that a change in an amplitude of the current signal will have little influence on an amplitude of the voltage signal.

The pick-up device 1 as discussed at the hand of the FIG. 1-3 comprises a first arrangement 31 for picking-up the power signal from the first cable 21, 22 in an inductive manner. The first arrangement 31 may comprise an inductive coupling, such as for example a magnetic core 61, 62 as discussed for the FIGS. 1 and 2. The pick-up device 1 comprises a second arrangement 35, 36 for picking-up the data signal from the first cable 21, 22 in a capacitive manner. The second arrangement 35, 36 may comprise a capacitive coupling, such as for example electrodes 71-74 as discussed for the FIGS. 1 and 3.

In this pick-up device 1, the first arrangement 31, 32 has been extended with a power processing circuit 32 such as for example an AC-DC-converter etc. for feeding a load 34, and the second arrangement 35-37 has been extended with a data processing circuit 37 for controlling the power processing circuit 32. Alternatively, the load 34 may be located outside the pick-up device 1. This load 34 may be a lamp or any other kind of load. The first arrangement 31-33 may further comprise a switching circuit 33 for in a conductive mode short-circuiting an input of the power processing circuit 32. For the power signal in the form of the current signal, the load 34 is switched off by short-circuiting the input of the power processing circuit 32. The second arrangement 35-38 may further comprise a conditioning circuit 38 such as for example a differential amplifier etc. for conditioning the data signal, such as for example filtering the data signal etc.

The termination device 11 as discussed for the FIG. 7-9 comprises a fifth arrangement 51-54 for providing a relatively low impedance to the power signal and for providing a relatively high impedance to the data signal. An inductor 51 is for example realized via the magnetic core 61, 62 as discussed for the FIGS. 7 and 8. A serial circuit of a capacitor 52, a resistor 53 and a capacitor 54 is for example realized via the electrodes 71-74 and the resistor 79 as discussed for the FIGS. 7 and 9. The resistor 53 matches the first cable 21, 22 with respect to the data signal and the capacitors 52, 54 block the power signal.

In the FIG. 11, a two cable system with five devices 3, 10 and 11-13 is shown. A provision device 10 may be identical to the one discussed for the FIG. 10. Termination devices 11-13 comprising fifth arrangements 55-57 may be identical to the one discussed for the FIG. 10. A pick-up and transfer device 3 as discussed for the FIG. 4-6 for transferring the signals from the first cable 21, 22 to a second cable 23, 24 in an electrically contactless manner comprises a first arrangement 31 arranged for transferring the power signal to the second cable 23, 24 in an inductive manner, and a second arrangement 35, 36 arranged for transferring the data signal to the second cable 23, 24 in a capacitive manner.

The first arrangement 31 may comprise an inductive coupling, such as for example a magnetic core 61, 62 as discussed for the FIGS. 4 and 5. The second arrangement 35, 36 may comprise a capacitive coupling, such as for example electrodes 71-74 as discussed for the FIGS. 4 and 6.

Figure 12:
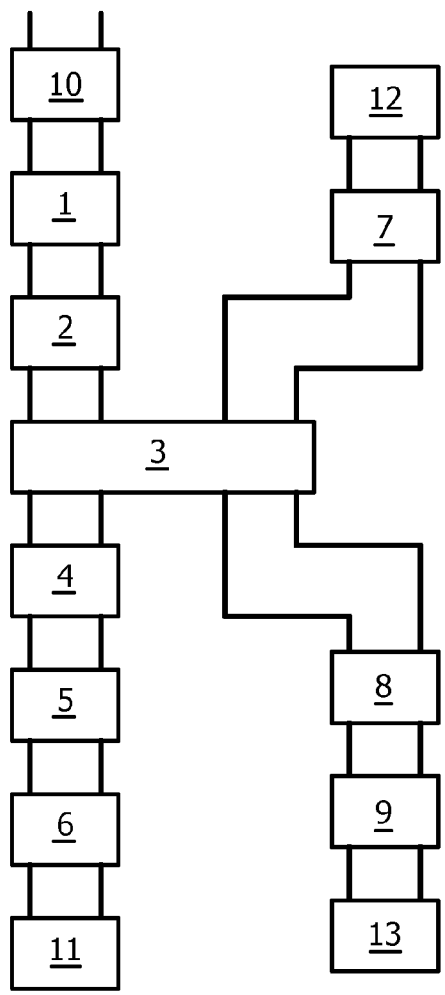
FIG. 12 shows a two cable system with thirteen devices.

In the FIG. 12, a two cable system with thirteen devices 1-13 is shown. A provision device 10 may be identical to the one discussed for the FIG. 10. Termination devices 11-13 may be identical to the one discussed for the FIG. 10. Pick-up devices 1, 2 and 4-9 may be identical to the one discussed for the FIG. 10. And the pick-up and transfer device 3 may be identical to the one discussed for the FIG. 11.

Figure 13:
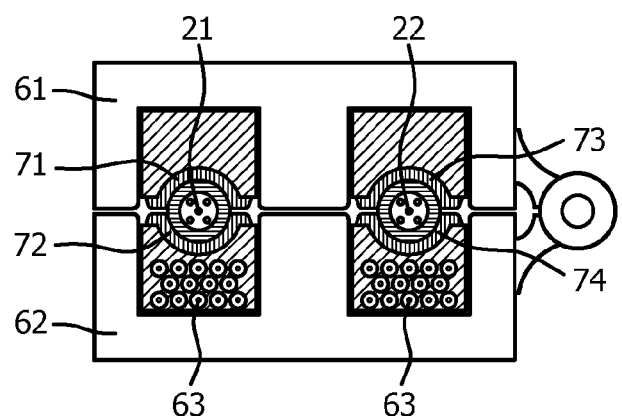
FIG. 13 shows a cross-section of an inductive and capacitive coupling.

In the FIG. 13, a cross-section of an inductive and capacitive coupling is shown. When comparing the FIG. 13 with the FIGS. 2 and 3 and with the FIGS. 5 and 6 and with the FIGS. 8 and 9, it becomes clear that in the FIG. 13, the first and second electrodes 71-74 have been arranged inside the magnetic core 61, 62 and/or form integral parts of this magnetic core 61, 62. This is a most compact embodiment.

As an alternative to the termination devices 11-13, it is possible to extend the conductors 21-24 of the cables 21-24 by a few meters and to short-circuit their ends. This way, a relatively low impedance is created for the relatively low frequency power signal and a relatively high impedance is created for the relatively high frequency data signal.

The first cable 21, 22 may be arranged to transport a first cable signal different from the data signal and the power signal. The first cable signal may be an AC supply signal or a DC supply signal or an audio signal or a video signal or an internet signal etc. In view of the loop in the FIG. 7, the first and second conductors 21, 22 then together form one of the two wires of a two-wire-cable for transporting said first cable signal etc.

The electrodes 71-74 may be made of a solid metal, e.g. copper or aluminium. A half-circle shaped grove may be provided in each electrode half, which fits to an outer diameter of a conductor 21-24. Top and bottom bases 75, 76 may be formed from a non-conductive, solid material, e.g. plastic. Each base 75, 76 may comprise a groove, which fits to the outer diameter of the conductor 21-24. To this non-conductive base 75, 76, the thin conductive electrodes 71-74 may be applied, e.g. by evaporation, printing, galvanic deposition or by gluing thin metal sheets to the base. The electrodes 71-74 may be formed through conductive foam or other elastic conductive material. As an advantage, this solution can adapt to different conductor diameters. Each base 75, 76 may be formed from a non-conductive elastic or foam-like material. To this base 75, 76, thin conductive electrodes 71-74 may be applied, e.g. by evaporation, printing, galvanic deposition. The electrodes 71-74 are thin enough to remain flexible, such that they can adapt to different conductor diameters. Electrodes may be arranged only to one of the two bases to reduce the costs. This would requires a longer housing to achieve a similar capacity compared to electrodes on both bases, but would be easier to manufacture.

So, the electrodes 71-74 may get a shape to be formed around the conductors 21-24 of the cables 21-24. These conductors 21-24 usually comprise a conductive wire surrounded by an isolative layer. By having introduced a top part and a bottom part in the first arrangement 31 and by having introduced a top base and a bottom base in the second arrangement 35, 36, the pick-up device 1-9 can be easily clipped around the cables 21-24.

Finally, the electrodes 71-74 may serve an additional purpose, if they are made of an elastic material. In this case, the elastic material may serve as a sealing of the pick-up device 1-9 against dirt and moist at the inlet and the outlet of the pick-up device 1-9. The second arrangement 35, 36 is split into two parts, a left part situated left from the first arrangement and a right part situated right from the first arrangement, to seal the inlet and the outlet of the pick-up device 1-9.

The word "opening" should not be looked at too limitedly and may comprise a gap, a hole, a space, a recess, a cut, an indentation, a notch, a crevice, a cavity etc. First and second elements may be coupled directly without a third element being in between and may be coupled indirectly with a third element being in between, and without having excluded a fourth element etc.

Summarizing, pick-up devices 1-9 for picking-up signals from first cables 21, 22 in electrically contactless manners comprise first arrangements 31 for picking-up power signals from the first cables 21, 22 in inductive manners and second arrangements 35, 36 for picking-up data signals from the first cables 21, 22 in capacitive manners. The first arrangements 31 may comprise inductive couplings such as magnetic cores 61, 62 with first openings for surrounding parts of first conductors 21 of the first cables 21, 22 and with second openings for surrounding parts of second conductors 22 of the first cables 21, 22. The second arrangements 35, 36 may comprise capacitive couplings such as first and second electrodes 71-74. The pick-up devices 1-9 may be pick-up and transfer devices 3 for transferring the signals to second cables 23, 24 in electrically contactless manners. Provision devices 10 provide the signals in electrically conductive manners and termination devices 11-13 terminate the cables 21-24.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A pick-up device for picking-up signals from a first cable in an electrically contactless manner, the pick-up device comprising:
an inductive coupling for picking-up a power signal from the first cable in an inductive manner; and
a capacitive coupling for picking-up a data signal from the first cable in a capacitive manner, the data signal being different from the power signal, the pick-up device being a pick-up and transfer device for transferring the signals to a second cable in an electrically contactless manner, the inductive coupling being arranged for transferring the power signal to the second cable in an inductive manner, and the capacitive coupling being arranged for transferring the data signal to the second cable in a capacitive manner, wherein the first and second cables are arranged in a parallel orientation within the pick-up device, wherein the inductive coupling comprises a magnetic core with a first opening for surrounding at least a part of a cross section of a first conductor of the first cable and for surrounding at least a part of a cross section of a third conductor of the second cable and with a second opening for surrounding at least a part of a cross section of a second conductor of the first cable and for surrounding at least a part of a cross section of a fourth conductor of the second cable; and wherein the capacitive coupling comprises first and second electrodes, the first electrodes being located closer to the first and third conductors than to the second and fourth conductors, and the second electrodes being located closer to the second and fourth conductors than to the first and third conductors.

2. A termination device for terminating a first cable coupled to a provision device or for terminating a second cable coupled to a pick-up device for picking-up signals from the first cable in an electrically contactless manner, the pick-up device comprising an inductive coupling for picking-up a power signal from the first cable in an inductive manner and a capacitive coupling for picking-up a data signal from the first cable in a capacitive manner, the data signal being different from the power signal, the termination device comprising:

an arrangement for providing a first impedance to the power signal and for providing a second impedance to the data signal, the second impedance being higher than the first impedance, wherein the termination device includes a magnetic element having at least two parts which are connectable and disconnectable around the first or second cable, wherein the arrangement comprises:

a magnetic core with a first opening for surrounding at least a part of a cross section of a first conductor of the first cable or for surrounding at least a part of a cross section of a third conductor of the second cable and with a second opening for surrounding at least a part of a cross section of a second conductor of the first cable or for surrounding at least a part of a cross section of a fourth conductor of the second cable, the first and second conductors or the third and fourth conductors being coupled to each other in an electrically conductive manner behind the magnetic core; and a resistive and capacitive coupling, the resistive and capacitive coupling comprising a resistor for matching the first or second cable with respect to the data signal and comprising a capacitor for blocking the power signal.

* * * * *